United States Patent Office
3,093,501
Patented June 11, 1963

3,093,501
METAL COATING ON NON-METAL BODY BY TUMBLING
Erith T. Clayton, Baltimore, Md., assignor to Peen Plate, Inc., Baltimore, Md., a corporation of Maryland
No Drawing. Filed Apr. 4, 1958, Ser. No. 726,354
Claims priority, application Great Britain Apr. 4, 1957
5 Claims. (Cl. 117—29)

This invention relates to improvements in or relating to the production of metallic coatings and non-metallic articles so coated.

The present invention provides a process for plating the surface of a non-metallic article with a continuous layer of a metal wherein the said article is embedded in a mass of particles of the plating metal and is subjected to impacts by individual particles of the plating metal which are originally present in a malleable state and in substantially spherical or other non-laminar form and relatively free from strain hardening and corrosion products and sufficiently fine and at a sufficiently high temperature but below their melting point to permit of their distortion and flattening against the surfaces of the article under the impacting energy available for each particle, whereby each particle is plastically deformed and conforms to the microscopic profile of the article, welding to the article surface and to successive layers of particles thereon by virtue of the intimate contact between the clean surfaces being plated and the freshly ruptured metal at the particle surfaces occasioned by the rapid increase of particle surface area; and accumulating on said article surface a plurality of successive interfitting mutually adherent layers of said so-flattened particles, each deposited in toto, as a continuous deposit on the article surface so as to form thereon a solid metallic plated adherent coating; the entire operation of accumulating the several layers on the article surface being conducted in a water-free gaseous or evacuated environment chemically inert to the surface of the metal of the particles and articles.

The process of the present invention is applicable to the treatment of non-metallic surfaces in general, for example, glass, ceramics, plastics, boron carbide.

Preferably the process is carried out in the presence of certain abradable addition substances or film formers which on sliding on the non-metallic surface being treated produce a very thin weak film of the addition substance on the non-metallic surface. Examples of suitable addition substances are plastic resins such as nylon and polyethylene. Other less preferable examples of such substances are sulphides of heavy metals and graphite.

The plastic resins are particularly suitable as addition substances and may be used in a variety of different forms. The plastic resins may be used as finely ground powder or they may be used in the form of small chunks or large pieces, in which case the forces of attrition in the mill serve to grind away the surface of the plastic chunks smearing the plastic onto the metal powder, the article under treatment and the impact media. In place of chunks, a liner such as polyethylene liner may be used to line the mill and in specialized cases the plastic chunks may be used without the other impact medium, serving this purpose themselves.

Highly lustrous and very beautiful coatings have been achieved using this technique. A very wide range of plastics as addition substances have been tried successfully. This includes such substances as acrylic resins, polyethylene, the polyamide resins such as nylon, the polystyrenes, the polyvinyl chlorides particularly in unplasticized form, polyvinyl butyrals, cellulose acetate, polyvinyl acetates, silicones and natural gums.

In place of the plastic resin addition substances referred to above, sulphides of the heavy metals which have pronounced lubricating abilities may be used and are particularly effective for the build up of heavy coatings on glass. The coatings are very heavy, very adherent and very smooth, but they lack the lustre of coatings produced with the aid of the plastic resins. The sulphides of the heavy metals are black in color and the resultant coating tends to have a dull or dark matte finish. This effect relates only to appearance, as conductivity and other properties appear unaffected. Sulphides which have been found to be particularly effective are the sulphides of such metals as lead, tungsten and molybdenum.

Finely powered graphite may be used as a lubricant and film former. This is subject to the same disabilities as the heavy metal sulphides.

The addition substances recited herein are used as film formers in the coating process.

The addition substances should not be so soft that the surface to be coated becomes so covered with a film of the addition substance that it is not possible to achieve a good lattice contact between the metal plating particle and the non-metallic surface. Similarly, additions of such addition substances must be limited so that the amount of film formed is not sufficient to obstruct completely the plating mechanism, but rather forms sporadic inclusions within the continuous metal coating.

The use of some plastic resins coats the metal powder particles and the article under treatment with a fairly substantial, tough film and it is believed that this is the reason why the use of excessive quantities of some types of plastic resins results in a greatly decreased rate of deposition. With some plastic resins it is difficult to achieve a heavy coating if the operation is conducted at room temperature. However, if the temperature of operation is raised, then the thickness of coating may be increased.

The plastic resins may be used over again, particularly when used in the form of small chunks. It is usually found desirable to withdraw a small percentage from each run and to replace it with fresh material. The plastic resin may suffer from degradation. This degradation is particularly apt to occur unless precautions are taken to ensure the complete absence of all moisture. The degradation of the plastic resin leads to coatings having a bluish or dull cast which are not as attractive as the bright, metal coatings. The degradation does not appear to affect the efficiencies of the operation. It has been found that this degradation of the plastic resin can be eliminated if the entire contents of the mill are heated above the boiling point of water to ensure that all moisture is removed. The contents of the mill may then be cooled in a dessicator or otherwise, or if the temperature does not exceed 100° C. the mill may be run hot.

In place of heating the contents of the mill, the metal powder itself may be heated to ensure that it is completely dry. This can be accomplished by placing the powder under an infra-red lamp.

It should be noted that very finely divided aluminum powder of approximately 400 mesh constitutes a definite explosion hazard and many commercial mills working with this material have from time to time blown up. The use of the plastic resins which coat the metal particles with a film which in some cases appears to be quite greasy appears to reduce this hazard.

Various coating metals may be used such as aluminum, tin and zinc, and it will be understood that the term "metal" as used herein includes alloys.

The following examples illustrate how the process of the invention may be carried into effect:

*Example 1*

This example describes the plating of small subminiature radio tubes made of glass to be plated with aluminum, the object of the coating being to shield and also to provide additional strength to the tube for conditions of severe service. These sub-miniature tubes had a number of wires protruding from the end. These copper wires were tinned and it was important that neither the wires nor the glass surface from which they emerged be coated. Any coating of this glass area would have constituted a short between the wires. The first step, therefore, was to shield these, and this was effected by dipping the wires and the edge of glass which were not being coated in plastic which could subsequently be removed. Thirty-five of these radio tubes were added to a porcelain mill of five-quart capacity which had no lining of any kind. The mill was filled half full of a mixture of No. 10 and No. 18 crushed iron shot which had been coated with aluminum in a previous operation. No. 10 and No. 18 crushed iron shot is referred to as grit and is approximately of 10 and 18 mesh respectively. To the radio tubes and grit were added 15 grams of aluminum powder which had been heated under an infra-red lamp for half an hour to remove all traces of water vapor and 5 grams of a polyethylene plastic in the form of fine powder. The mill was sealed tightly to prevent any ingress or egress of air and rotated at 50 r.p.m. for six hours when the glass radio tubes were found to be coated with a bright, attractive, continuous coating of aluminum which was completely conductive.

*Example 2*

A collection of small plastic articles was added to a mill of five-quart capacity. This mill was filled approximately half full of small lead slugs which had been heavily coated with aluminum by a previous operation using the same process. Twenty grams of aluminum powder were added together with 5 grams of fine powdered plastic and two grams of polystyrene plastic. The aluminum had been given the same heat treatment as in Example 1. The mill was rotated at 50 r.p.m. for six hours when the plastic articles were found to have received a bright, thin, adherent coating of aluminum.

*Example 3*

A number of small wooden panels which could not be plated directly were treated with and impregnated by a solution of sodium silicate so that the surface of the wood presented a smooth, glassy appearance. These small pieces of wood were then plated in a manner analogous to that of Example 1. This is an example of the alteration of the physical properties of the surface of a non-metal which, itself, is not amenable to plating, but which may be altered by impregnation or otherwise in order to render the surface suitable. In general, a surface which is soft and abradable as wood may not be plated without prior treatment.

What we claim is:

1. A process of coating non-metallic surfaces of articles with a plurality of layers of metal particles comprising the steps of placing articles having non-metallic clean surfaces in a container, adding a plurality of individual and completely dry fine particles of a plating metal, said particles being in a substantially spherical and non-laminar form, and in a malleable state and free from strain hardening and corrosion products, adding a charge of impact media and a charge of a solid abradable film forming substance capable of forming a film of the substance on the articles and metal particles but insufficient to prevent the formation of a good lattice contact between the metal plating particle and the non-metallic surface, agitating the container to cause abrasion by sliding of the substance on the articles and particles to form a weak film of the substance on the articles and metal particles to promote the subsequent coating of the metal particles on the articles, and further to cause the metal particles to be plastically deformed and weld and conform to the microscopic profile of the article and to weld the metal particles to each other on the surface to form a continuous solid metal coating having a plurality of interfitting layers of the metal particles, and sporadic inclusions throughout the continuous solid coating of said solid film forming substance, the operating temperature enabling distortion and flattening of the metal particles and being below the melting point of the metal particles and substance to maintain the completely dry condition, and the operation being conducted in a liquid free environment chemically inert to the surfaces of the articles, the metal particles and the substance.

2. A process as claimed in claim 1, wherein each article is composed of soft abradable materials having a surface too soft to withstand the mechanical action of the impacting bodies and wherein the surface of such article is first impregnated with sodium silicate, and allowed to dry and harden.

3. A process as set forth in claim 1, wherein each article is composed of wood having a relatively soft surface and which surface is first impregnated with sodium silicate and allowed to dry and harden.

4. A process as claimed in claim 1 wherein the substance is nylon.

5. A process as claimed in claim 1 wherein the substance is polythene.

References Cited in the file of this patent

UNITED STATES PATENTS

| Re. 23,861 | Clayton | Aug. 31, 1954 |
| 1,128,058 | Schoop | Feb. 9, 1915 |
| 2,378,588 | Skehan et al. | June 19, 1945 |
| 2,387,872 | Bell | Oct. 30, 1945 |
| 2,423,880 | DeGraaf | July 15, 1947 |
| 2,618,572 | Parrish | Nov. 18, 1952 |
| 2,640,002 | Clayton | May 26, 1953 |
| 2,788,297 | Louis | Apr. 9, 1957 |
| 2,793,965 | Myers et al. | May 28, 1957 |
| 2,817,603 | Louis | Dec. 24, 1957 |
| 2,817,604 | Louis | Dec. 24, 1957 |

FOREIGN PATENTS

| 3,858 | Great Britain | 1868 |